Oct. 6, 1959

H. M. RUTLEDGE ET AL 2,907,928

RINGLESS SOCKET METER BOX WITH MEANS FOR
DISCONNECTING THE METER

Filed Oct. 18, 1956

*INVENTORS*
HAL M. RUTLEDGE and
CRAIG M. MOORE

BY *Frease & Bishop*

ATTORNEYS

Oct. 6, 1959
H. M. RUTLEDGE ET AL
2,907,928
RINGLESS SOCKET METER BOX WITH MEANS FOR
DISCONNECTING THE METER
Filed Oct. 18, 1956
2 Sheets-Sheet 2
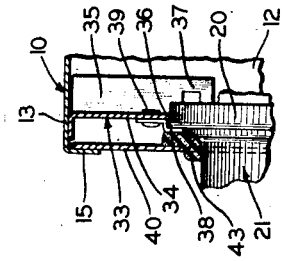
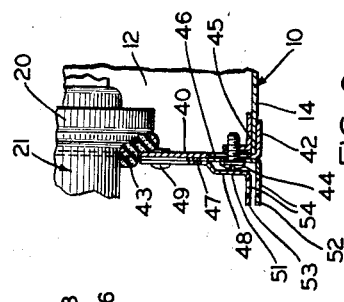
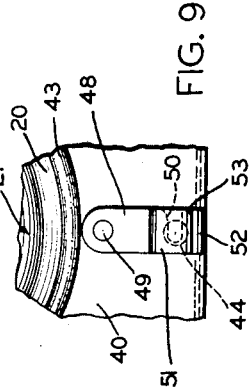
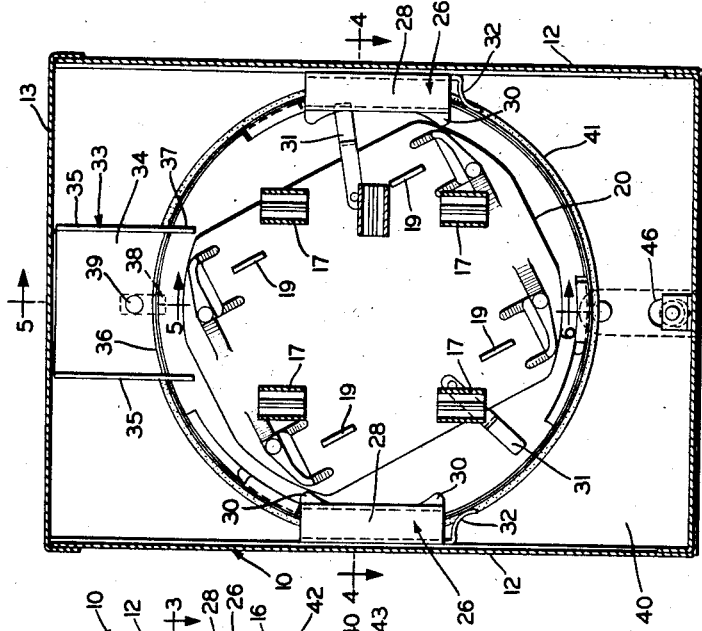
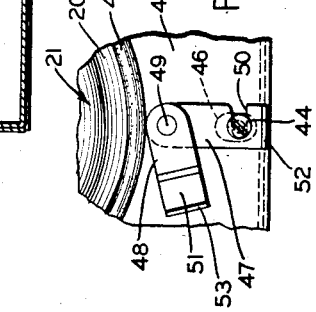
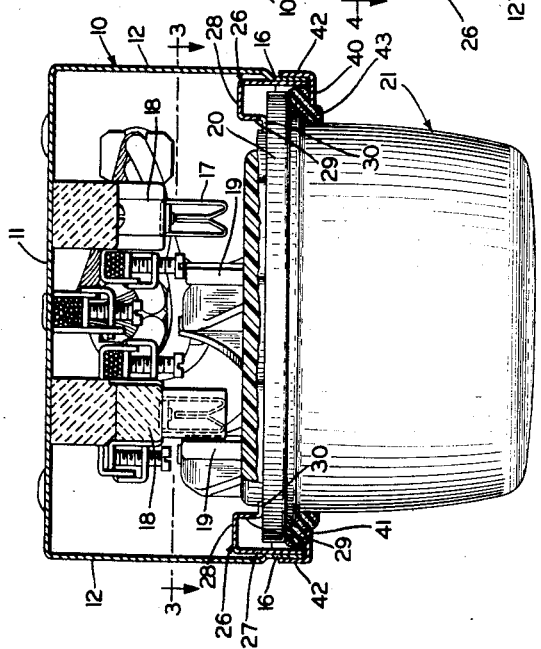
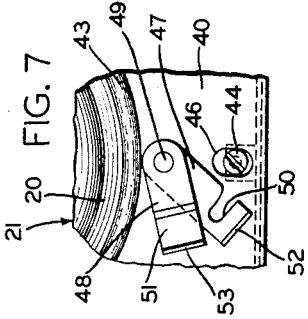
INVENTORS
HAL M. RUTLEDGE and
BY CRAIG M. MOORE
*Frease & Bishop*
ATTORNEYS

United States Patent Office 2,907,928
Patented Oct. 6, 1959

2,907,928

RINGLESS SOCKET METER BOX WITH MEANS FOR DISCONNECTING THE METER

Hal M. Rutledge, Canton, and Craig M. Moore, North Canton, Ohio, assignors to The Superior Switchboard & Devices Company, Canton, Ohio, a corporation of Ohio Application October 18, 1956, Serial No. 616,783

6 Claims. (Cl. 317—109)

The invention relates to ringless socket meter boxes, and more particularly to a box of this type having means for retaining a meter therein in disconnected condition.

There are numerous occasions where it is desirable to shut off the current to the customer without removing the meter from the box. One instance is where a customer desires the current to be shut off temporarily at a summer residence or the like, at the end of the summer season, with the understanding that current is to be turned on in the spring.

If the meter is removed from the box and taken away when the current is shut off, there is little likelihood that when current is again turned on, the same meter will be installed in the box. This then means that with the return of service to the customer the utility has to go through considerable trouble and expense to change their complete set of records for billing purposes.

The object of the present invention is to provide a means and method for retaining a watt-hour meter in disconnected condition within a socket meter box.

Another object is to provide means in the meter box for preventing a disconnected meter from contacting the hot terminal jaws in the box.

A further object is to provide a combined rest bracket and surge clips upon the box for holding the meter in disconnected position, and for contact with the usual surge links on the meter when in connected position.

It is also an object of the invention to provide ears upon the inside of the meter box for preventing the meter from slipping or moving downward in the box when in disconnected position.

Another object is to provide a meter locator bracket within the box for locating the meter in the box, in either disconnected or connected position.

A further object is to provide such a socket meter box having a pivoted latch to retain the meter in the box in disconnected position when the cover is removed from the box.

A still further object of the invention is to provide a novel latch for locking the cover upon the meter box.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

In general terms the invention may be described briefly as comprising a ringless type socket meter box having spaced terminal jaws therein for engaging the usual terminal posts or blades of a conventional watt-hour meter.

Brackets are provided on each side wall of the box at the open front side thereof, forming stops or rests for the base of the meter for preventing the same from contacting the hot terminal jaws in the box, when the meter is in disconnected position. These brackets have projections thereon forming surge clips for contact with the usual surge links upon the base of the meter, when the meter is in connected position, for grounding the meter in the event of line surges caused by lightning.

Ears or lugs are provided at the lower ends of the brackets for engaging the periphery of the base of the meter to prevent the meter from slipping or moving downward in the box when in disconnected position.

A meter locator bracket is provided in the top of the box for contacting the periphery of the meter base in either the connected or disconnected position. A pivoted latch is associated with the meter locator bracket for preventing the meter from falling out of the box when in disconnected position, with the cover removed from the box.

A ringless type cover is provided, having a substantially circular opening of slightly greater diameter than the case of the meter, flange means being provided for connecting the upper end of the cover to the top of the box and latch means being provided for locking the lower end of the cover to the bottom of the box.

With this construction, when the cover is removed from the box, the meter may be removed, withdrawing the terminal blades or posts thereof from engagement with the terminal jaws in the box. The meter may then be partially turned, so as to locate the terminal blades or posts thereof at points spaced from the terminal jaws in the box, and the meter is positioned against the stop or rest brackets in the box and against the locator bracket therein and latched in position by the pivoted latch on the locator bracket, after which the cover may be replaced and locked.

Having thus briefly described the invention, reference is now made to the accompanying drawings showing a preferred embodiment of the invention, in which:

Fig. 3 is a section on the line 3—3, Fig. 4, showing the meter in disconnected position within the box;

Fig. 4 is a section on the line 4—4, Fig. 3;

Fig. 5 is a fragmentary detail section of the locator bracket and pivoted latch, taken as on the line 5—5, Fig. 3;

Fig. 6 is a detail, fragmentary sectional view through the lower portion of the box and cover, showing the latch for locating the cover upon the box, taken as on the line 6—6, Fig. 3;

Fig. 7 is a front elevation of the latch shown in Fig. 6, showing the same in open or unlatched position;

Fig. 8 is a similar view, showing the latch in partially latched position; and

Fig. 9 is a similar view, showing the latch in locked position.

Figure 2:
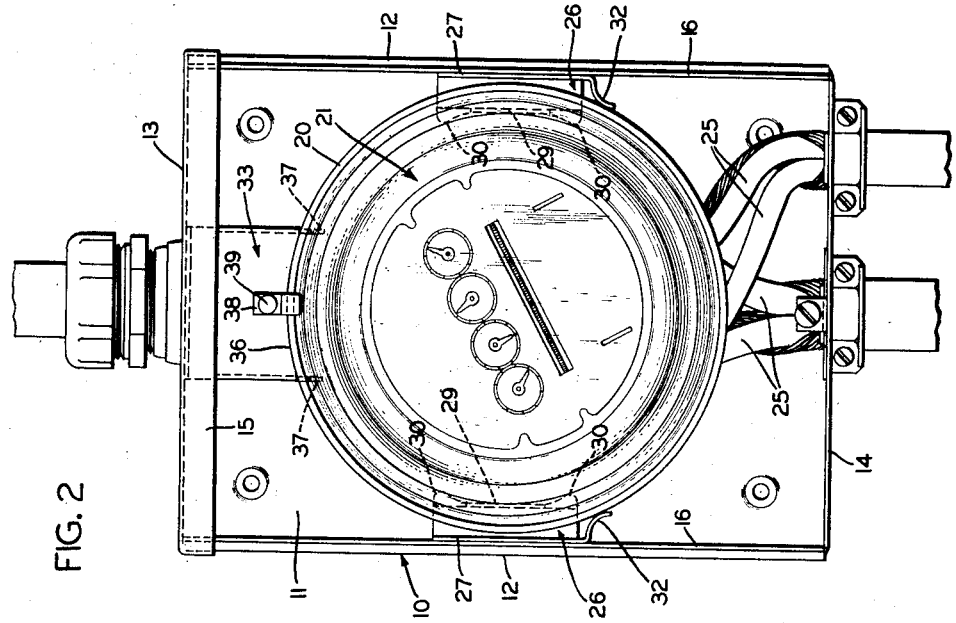
Fig. 2 is a front elevation of the box with the meter mounted in disconnected position within the box and the cover removed.
Figure 1:
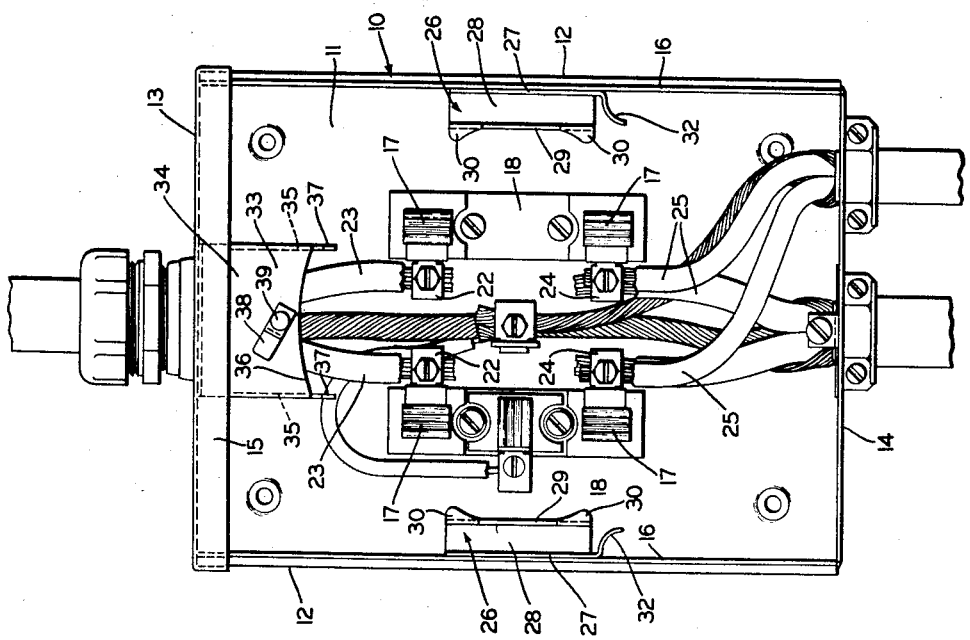
Fig. 1 is a front elevation of a meter box embodying the invention with the cover and meter removed therefrom.

Referring now more particularly to the construction illustrated in the accompanying drawings, in which similar numerals refer to similar parts throughout, the socket meter box is indicated generally at 10. This box is formed of sheet metal and includes the back wall 11, side walls 12, top wall 13 and bottom wall 14.

The top wall is shown as provided at its front end with the overhanging flange 15, and the side walls are preferably inwardly offset at the open front side of the box, as indicated at 16, in accordance with the usual practice in such boxes.

As is customary in socket-type meter enclosures, terminal jaws 17 are mounted upon insulation blocks 18 attached to the back wall 11 of the box and positioned to receive the terminal blades or posts 19 which project rearwardly from the base 20 of the conventional socket-type watt-hour meter, as indicated generally at 21.

The two upper terminal jaws 17 are provided with line wire connections 22 to which line wires 23 are connected, and the two lower terminal jaws 17 are connected by load wire connections 24 with the customer's load wires 25, as in usual and well known practice. This much of the structure may be of conventional form.

The invention consists primarily in means for supporting the meter within the box in disconnected condition, and for enclosing the meter so that it cannot be connected by an unauthorized person. For this purpose, a pair of support or rest brackets, indicated generally at 26, are provided, one of these brackets being mounted on each side wall 12 of the box, at the open front side thereof and substantially midway between the top and bottom of the box.

These brackets are formed of relatively heavy gauge sheet metal and are of generally channel shape as best shown in Fig. 4. Each bracket comprises the relatively deep flange 27, welded or similarly attached to the inner surface of the adjacent side wall of the box, the bottom wall 28 and the relatively narrow inner wall 29.

Inturned ears or flanges 30 are formed at opposite ends of the inner wall 29 and provide support means for engaging the rear surface of the meter base 20, as best shown in Fig. 4. The ears 30 are so positioned as to contact with the conventional surge links 31 on the underside of the meter base, when the meter is in connected position with the terminal blades 19 thereof received in the terminal jaws 17 of the box.

Thus the brackets 26 form combined rest or support brackets which prevent the base of the meter from contacting the hot terminal jaws of the box when the meter is in disconnected position, and also serve as surge clips contacting the usual surge links of the meter for the purpose of grounding the meter in the event of line surges caused by lightning.

Inwardly disposed ears or lugs 32 may be formed at the lower ends of the brackets 26, for the purpose of engaging opposite sides of the periphery of the meter base 20, below the center thereof, as best shown in Fig. 2, for preventing the meter from sliding or moving downward in the box when in the disconnected position.

For the purpose of locating the meter properly within the box, particularly in the disconnected position, a meter locator bracket, indicated generally at 33, is located in the upper portion of the box. This bracket is of generally channel shape having the flat front wall 34 and depending narrow side flanges 35.

The lower edge of the bracket 33 is of arcuate shape, as indicated at 36, conforming to the periphery of the meter base 20. The side flanges 35 project downwardly beyond the wall 34, forming rests 37 for the back of the meter base, as best shown in Fig. 5, while the periphery of the meter base is in contact with the arcuate edge 36 of the front wall 34 of the bracket 33.

For the purpose of retaining the meter in the box, when in disconnected position, as shown in Figs. 2, 3 and 4, a latch 38 is pivoted as at 39 upon the front wall 34 of the meter locator bracket adapted to be engaged over the base of the meter as shown in Figs. 2, 3 and 5.

The closure for the box comprises a substantially flat rectangular sheet metal cover 40 having a substantially circular opening 41 of somewhat larger diameter than the case of the meter 21. The upper end of the cover is adapted to be received beneath the overhanging flange 15 of the box, as indicated in Fig. 5.

Backturned flanges 42 are provided upon the side and bottom edges of the cover for engagement over the edges of the side walls 12 and bottom wall 14 of the box, respectively. A circular gasket 43, which may be of neoprene sponge or similar material, is located around the meter at the base so as to seal the opening 41 of the cover, as best shown in Figs. 4, 5 and 6.

For the purpose of latching the lower end of the cover to the lower end of the box, a headed stud 44, which may be in the form of a screw in order to provide adjustment, is carried by a bracket 45 from the inner side of the bottom wall 14 of the box and projects through the aperture 46 in the cover 40.

A pair of latch members 47 and 48 are provided, both being pivoted upon the cover at 49. The latch member 47 has a notch 50 in one side for engagement over the headed stud 44 and the latch member 48 has the raised outer end portion 51 to accommodate said headed stud, as best shown in Fig. 6.

The outer ends of the latch members 47 and 48 are provided with the flanges 52 and 53 respectively, having registering apertures 54 therein adapted to receive a lock, seal or the like for locking the latch members in the closed position, as shown in Figs. 6 and 9.

With this construction it will be seen that the meter may be retained in the socket meter box, in disconnected condition. For this purpose it is only necessary to unlatch and remove the cover 40, then disconnect the meter by withdrawing the terminal jaws or blades 19 thereof out of engagement with the terminal jaws 17 of the box.

The meter may then be turned axially slightly, as shown in Figs. 2 and 3, so as to locate the terminal blades 19 thereof at points spaced laterally from the terminal jaws 17 in the box, and the meter may be located against the brackets 26 and against the locator bracket 33 and the latch 38 moved to latched position over the meter base, as shown in Figs. 2, 3 and 5, thus retaining the meter in disconnected position within the box.

The cover may then be replaced upon the box and locked thereon by the latches 47—48, and the meter is thus held within the box in disconnected condition until such time as it may be desirable to again connect the meter.

It will be seen that when located in the disconnected position, as shown and above described, the meter cannot be connected by an unauthorized person.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. A meter installation for a meter having a base and terminal blades extending rearwardly therefrom, said meter installation comprising a socket-type box open at its front, a removable cover for the open front of the box, terminal jaws within the box for receiving said terminal blades when the meter is in connected position, support brackets located in one plane on three sides of the box for limiting backward movement of the meter in the box, means upon certain of said support brackets for contact with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

2. A meter installation for a meter having a base and terminal blades extending rearwardly therefrom, said meter installation comprising a socket-type box open at its front, a removable cover for the open front of the box, terminal jaws within the box for receiving said terminal blades when the meter is in connected position, support brackets located in one plane on three sides of the box for contact with the back of the meter base for limiting backward movement of the meter in the box, the support brackets on two opposite sides of the box comprising portions attached to the adjacent side of the box, portions disposed inwardly therefrom and forwardly disposed portions spaced inwardly from the adjacent side of the box, means upon certain of said support brackets for contact with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

3. A meter installation for a meter having a base and terminal blades extending rearwardly therefrom, said meter installation comprising a socket-type box open at its front, a removable cover for the open front of the box, terminal jaws within the box for receiving said terminal blades when the meter is in connected position, support brackets located in one plane on three sides of the box for contact with the back of the meter base for limiting backward movement of the meter in the box, the support brackets on two opposite sides of the box comprising portions attached to the adjacent side of the box, portions disposed inwardly therefrom, a forwardly disposed portion spaced inwardly from the adjacent side of the box, and a lug for contact with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

4. A meter installation for a meter having a base and terminal blades extending rearwardly therefrom, said meter installation comprising a socket-type box open at its front, a removable cover for the open front of the box, terminal jaws within the box for receiving said terminal blades when the meter is in connected position, support brackets located in one plane on three sides of the box for contact with the back of the meter base for limiting backward movement of the meter in the box, the support brackets on two opposite sides of the box comprising portions attached to the adjacent side of the box, portions disposed inwardly therefrom and forwardly disposed portions spaced inwardly from the adjacent side of the box, and terminating in inturned angular flanges for contact with the back of the meter base, means upon certain of said support brackets for contacts with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

5. A meter installation for a meter having a base, surge links thereon, and terminal blades extending rearwardly therefrom, said meter installation comprising a socket-type box open at its front, a removable cover for the open front of the box, terminal jaws within the box for receiving said terminal blades when the meter is in connected position, support brackets located in one plane on three sides of the box for contact with the back of the meter base for limiting backward movement of the meter in the box, the support brackets on two opposite sides of the box comprising portions attached to the adjacent sides of the box, portions disposed inwardly therefrom and forwardly disposed portions spaced inwardly from the adjacent side of the box and terminating in inturned angular flanges for contact with the back of the meter base, said inturned angular flanges comprising surge clips for contact with said surge links, means upon certain of said support brackets for contact with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

6. A meter installation for a meter having a base and terminal blades extending rearwardly therefrom, said meter installation comprising a socket-type box open at its front, a removable cover for the open front of the box, terminal jaws within the box for receiving said terminal blades when the meter is in connected position, support brackets located within the box on a plurality of its sides, said brackets being in a common plane substantially parallel to the plane of the terminal jaws, and between the jaws and the front of the box for limiting backward movement of the meter in the box, means upon certain of said support brackets for contact with the periphery of the meter base for preventing downward movement of the meter in the box, and latch means upon certain of said support brackets for engagement over the meter base to prevent removal of the meter from the box, whereby the meter may be rotated upon its axis so that the terminal blades thereon are spaced laterally from said terminal jaws within the box and may be supported upon said brackets in disconnected position.

References Cited in the file of this patent

UNITED STATES PATENTS

| | | |
|---|---|---|
| 2,115,429 | Rypinski | Apr. 26, 1938 |
| 2,126,602 | Bakke | Aug. 9, 1938 |
| 2,184,840 | Johansson et al. | Dec. 26, 1939 |
| 2,345,269 | Lackey | Mar. 28, 1944 |